United States Patent
Shiroyama et al.

[11] 3,803,541
[45] Apr. 9, 1974

[54] METHOD OF MONITORING OPERATING CONDITION OF SUBMARINE CABLE-BURYING DEVICES

[75] Inventors: Kaisuke Shiroyama, Yokohama; Takeo Yokoyama, Kamakura; Naoyuki Shimizu, Fujisawa; Kiyomi Minohara, Takarazuka, all of Japan

[73] Assignees: The Furukawa Electric Company Limited; Furuno Electric Co., Ltd., Minami-takaki-gun, Nagasaki Pref, both of, Japan

[22] Filed: June 7, 1972

[21] Appl. No.: 260,447

[30] Foreign Application Priority Data
June 12, 1971  Japan.............................. 46-41833

[52] U.S. Cl.................................. 340/3 R, 340/3 T
[51] Int. Cl.............................................. G01s 9/68
[58] Field of Search ..................... 340/1 R, 3 R, 3 T

[56] References Cited
UNITED STATES PATENTS
2,629,082  2/1953  Hare ................................. 340/1 R
3,005,973  10/1961  Kietz ................................. 340/3 T Primary Examiner—Richard A. Farley

[57] ABSTRACT

A method of monitoring operating condition of submarine cable-burying devices utilizing ultrasonic wave. The ultrasonic wave is emitted from at least two transmitter-receiver sets arranged on the side of a cable-burying device towards the ground under water and the ultrasonic wave reflected by the ground under water is received and measured by the transmitter-receiver sets to detect the position of the transmitter-receiver sets relative to the ground under water.

5 Claims, 4 Drawing Figures

FIG_1
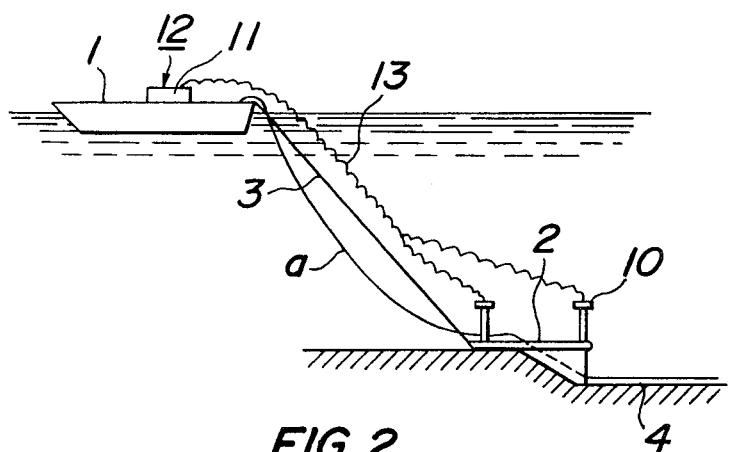
FIG_2
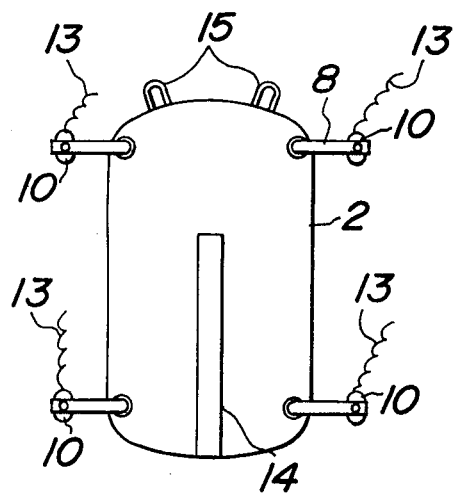

FIG_3
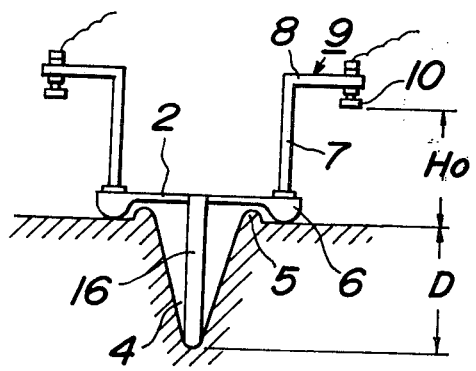
FIG_4
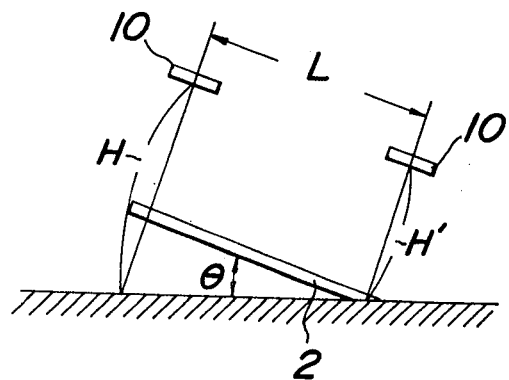

METHOD OF MONITORING OPERATING CONDITION OF SUBMARINE CABLE-BURYING DEVICES

This invention relates to a method of monitoring the attitude of a submarine cable-burying device for placing cable under ground under water and the depth of the device buried in the ground under water whereby the actual cable burying operation can be carried out in a safe and smooth manner.

As the need for communications and electrical power transmission services grows, more and more electrical cables are being installed under water. The method of burying the cable in the ground under water yields the advantage that the cable is concealed in the ground and therefore is not exposed to such abuse as abrasive wear caused by underwater currents or, what is more important, to damage caused by underwater objects being towed or dragged across the cable such as fishing trawler equipment or anchors.

In view of the above, a number of cable-burying devices have been developed and improved. In the actual cable burying operation, use has been made of cable-burying devices with jetting nozzles that direct streams of water or a plow to dig a trench for the cable.

Heretofore, it has been proposed to monitor the operating condition of the cable-burying device with the aid of a level meter mounted thereon. Such level meter, which detects the inclination of cable-burying device by gravity, cannot distinguish between the tilt by reason of the contour of the bottom of the water and the tilt owing to part of the device lifting off the bottom. Thus, the correct position of the cable-burying device relative to the contour of the ground under water required by the actual cable burying operation could not be detected by the conventional level meter. In other words, the conventional level meter always shows the horizontal position of the cable-burying device irrespective of whether or not the cable-burying device is being buried in the ground under water in a given depth. Thus, it is impossible to carry out the actual cable burying operation in a safe and smooth manner. Moreover, the conventional method of monitoring the cable-burying device with the aid of the level meter has the disadvantage that the depth of the cable-burying device buried in the ground under water could not be monitored.

It is an object of the invention to provide a method of monitoring operating condition of a submarine cable-burying device whereby the above-mentioned disadvantage of the conventional method can be obviated and the correct attitude of the cable-burying device relative to the ground under water and the depth thereof buried in the ground under water, both required in cable burying operation, can reliably be monitored in a safe and smooth manner.

The invention will be better understood and its advantages and features will be more readily apparent from the study of the following detailed description of an illustrative embodiment when it is read in conjunction with the drawing, in which:

FIG. 1 shows diagrammatically an embodiment of the invention;

FIG. 2 is a plan view showing a cable-burying device provided with four ultrasonic wave transmitter-receiver sets, two on each side of the device's center line and in the front and rear portions thereof;

FIG. 3 is its front view; and

FIG. 4 is a schematic representation illustrating a manner by which the inclination of the cable-burying device may be detected.

Now referring to the drawing, especially FIG. 1 thereof, reference numeral 1 represents a ship for towing a cable-burying device 2. The cable-burying device 2 placed on the ground under water in a depth of 20 m is towed by a cable 3 and proceeds on the ground under water to dig a trench 4 whose depth is 1 m and adapted to bury a submarine cable a therein.

The cable-burying device 2 is provided under its side edges with two side sledges 6, 6, one under each side of the device's center line, which play a role of stabilizing the cable-burying device 2 so as to hold it at a constant level determined by the contour of the ground under water. The side sledges 6, 6 are positioned outside those raised portions 5, 5 of the ground under water which are formed by piling up the sand dug out of the trench 4.

The cable-burying device 2 is provided at its side edges with four brackets 9, two on each side of the device's center line and in the front and rear portions of the cable-burying device 2, respectively. In the embodiment shown in FIGS. 2 and 3, each brackets 9 is made as an inverted L-shaped pole whose vertical portion 7 is 1.5 m in length and transverse portion 8 is 50 cm in length.

Provision is made of an ultrasonic wave depth measuring device 12 comprising ultrasonic wave transmitter-receiver sets 10 and an electric supply source control set 11. The transmitter-receiver sets 10 are mounted on the brackets 9, respectively, while the electric supply source control set 11 is installed on the towing ship 1. The lengths of the vertical portion 7 and transverse portion 8 of the inverted L-shaped pole 9 are selected such that the ultrasonic wave emitted from the transmitter-receiver sets 10 is not impinged upon a part of the cable-burying device 2 by taking into consideration the radiation angle of the ultrasonic wave. Each transmitter-receiver set 10 comprises a conventional ultrasonic wave vibrator adapted to vibrate at a frequency of 200 KHz. The electric supply source control set 11 comprises a recording and reproducing device adapted to record and reproduce the position of the transmitter-receiver set 10 relative to the ground under water in a form of distance, and as a result, a correct attitude and digging depth of the cable-burying device 2 may be monitored remotely from the towing ship. 1. Reference numeral 13 designates cables for connecting the transmitter-receiver sets 10 to the electric supply control set 11, 14 a cable guide groove, and 15 eyelets to which the towing cable 3 may be attached.

Although the four transmitter-receiver sets 10 have been described as being mounted upon the cable-burying device 2, two on each side of the device's center line and in the front and rear portions thereof as shown in FIGS. 2 and 3, it is clear that the number and arrangement of the transmitter-receiver sets 10 may be changed, depending on desired monitoring accuracy. For example, three may be used — three on three vertexes of a triangle, respectively, and one of the vertexes on or each side of the center line of the cable-burying device, or two may be used — one at each end of a diagonal of the cable-burying device 2.

In order to monitor the actual cable-burying operation of the cable-burying device 2 provided with four transmitter-receiver sets 10 of the ultrasonic wave depth measuring apparatus 12, the ultrasonic wave having a frequency of 200 KHz is emitted from each of the four transmitter-receiver sets 10 towards the ground under water and each of these waves reflected by the ground under water is received by the four transmitter-receiver sets 10. Thus, the time required for the ultrasonic wave transmitted from and received by the four transmitter-receiver sets 10 is measured to detect the position of the transmitter-receiver sets 10 relative to the ground under water in the form of the distance therebetween. The distance thus measured is transmitted in the form of electric signals to and recorded and reproduced by the recording and reproducing device of the electric supply source control set 11.

When the cable-burying device 2 is not inclined towards right or left with respect to its moving direction so that its attitude is normal, the distance of each of the transmitter-receiver sets 10 relative to the ground under water is not changed.

If the cable-burying device is inclined by an angle $\theta$ towards right with respect to its moving direction, the angle $\theta$ is given by $$\theta = \tan^{-1} H-H'/L$$

where $H$ is the distance from the left side transmitter-receiver sets 10 to the ground under water and measured by these sets 10, $H'$ is the distance from the right side transmitter-receiver sets 10 to the ground under water and measured by these sets 10, and L is the distance between the left and right side transmitter-receiver sets 10, 10. The electric supply source control set 11 is designed such that the calculation given by the above equation can be performed so that the value of the inclined angle $\theta$ can be detected.

In order to monitor the depth of the cable-burying device 2 buried in the ground under water, in other words, the depth of the submarine cable $a$ buried in the ground under water, it is necessary to predetermine the distance between the transmitter-receiver sets 10 and the ground under water which ought to be obtained in actual measurement if the cable burying device runs in the normal condition, digging a trench in a desired depth, and make this predetermined distance memorized by a memory included in the electric supply source control set 11. Then, the distance between the transmitter-receiver sets 10 and ground under water measured during the actual cable-burying operation is compared with the data stored in the memory to read the difference between the two distances, and as a result, the depth of the cable-burying device 2 buried in the ground under water is detected.

In case of measuring the depth of the cable-burying device 2 buried in the ground under water, errors in the measurement are usually encountered by possible inclination of the cable-burying device 2 as described above with reference to FIG. 4. These errors in the measurement are given by $$(D+H_0)(1-\cos\theta)$$

Where $D$ is the depth of the cable $a$ buried in the ground under water, and $H_0$ is the distance between the ground under water and the transmitter-receiver sets 10. In general, the cable-burying device 2 is designed such that $D+H_0$ is 2 m to 2.5 m and that the inclined angle $\theta$ of the cable-burying device 2 is on the order of less than the value of 10° to 15° in the actual cable-burying operation. Thus, the above-mentioned errors in the measurement are on the order of less than the value of 3 cm to 7.5 cm, and are extremely small. Thus, highly accurate measurements can be performed during the actual cable-burying operation.

As stated hereinbefore, according to the invention, ultrasonic waves are emitted from at least two transmitter-receiver sets, one on each oside of the cable-burying device's center line and in the front and rear portions thereof, towards the ground under water in case of burying submarine cables in the ground under water and the ultrasonic waves reflected by the ground under water are measured to detect the position of the transmitter-receiver sets relative to the ground under water, and as a result, the condition of the submarine cable buried in the ground under water is monitored remotely from the surface, so that the attitude of the cable-burying device and the depth of the cables buried in the ground under water can reliably be monitored in a simple and easy manner and hence the actual cable-burying operation may be carried out in a safe and smooth manner.

It is obvious to those skilled in the art that numerous changes and modifications may be made to the embodiment as it has been disclosed above without departing from the spririt and scope of the invention.

What is claimed is:

1. A method of monitoring the operating condition of a submarine cable-burying device provided with a digging tool and stabilizing side sledges having base surfaces, comprising:

mounting at least one ultrasonic wave transmitter-receiver set on brackets projected out of said cable-burying device to locate said ultrasonic wave transmitter-receiver sets on each side of the center line of said cable-burying device and on the outside of the image zone of said cable-burying device which is projected onto the ground under water;

emitting ultrasonic waves from said transmitter-receiver sets toward the ground under water in a direction perpendicular to a plane inclusive of said base surfaces of the stabilizing side sledges;

receiving the ultrasonic wave reflected by the ground under water by said transmitter-receiver;

measuring each ultrasonic wave reflected by the ground under water; and detecting the position of said transmitter-receiver sets relative to the ground under water to monitor the attitude and digging depth of said cable-burying device.

2. A method of monitoring operating condition of a submarine cable-burying device as claimed in claim 1 wherein the angle $\theta$ of inclination, in any direction, of said cable-burying device against the ground under water is obtained by $$\theta = \tan^{-1} H-H'/L$$

where $H$ is the distance between the any one of transmitter-receiver sets and the ground under water and measured by these sets, $H'$ is the distance from any other transmitter-receiver set to the ground under water and measured by these sets, and L is the distance between the said two transmitter-receiver sets, said angle $\theta$ being calculated by an electric supply source control set designed to calculate said angle $\theta$.

3. A method of monitoring operating condition of a submarine cable-burying device as claimed in claim 1 wherein the distance between said transmitter-receiver sets and the ground under water at the attitude of said cable-burying device placed on the ground under water at a desired depth is measured and stored in a memory included in an electric supply source control set installed on a ship for towing said cable-burying device and then the distance thus stored in the memory is compared with the distance between the transmitter-receiver sets and the ground under water measured during the actual cable burying operation, thereby detecting the depth of the cable-burying device buried in the ground under water.

4. A method of monitoring operating condition of a submarine cable-burying device as claimed in claim 1 wherein use is made of four ultrasonic wave transmitter-receiver sets and two of said ultrasonic wave transmitter-receiver sets are arranged on each side of the center line of said cable-burying device and in the front and rear portions thereof.

5. A method of monitoring operating condition of a submarine cable-burying device as claimed in claim 1 wherein use is made of three ultrasonic wave transmitter-receiver sets arranged at the vertexes of a triangle, respectively, one of said vertexes being positioned on one side of the center line of said cable-burying device.

* * * * *